United States Patent
Nguyen

[11] Patent Number: 5,940,209
[45] Date of Patent: Aug. 17, 1999

[54] INTERACTIVE OPTICAL FIBER AMPLIFIER, SYSTEM AND METHOD

[75] Inventor: Khanh Cong Nguyen, Whitehall, Pa.

[73] Assignee: Lucent Technologies Inc., Murray Hill, N.J.

[21] Appl. No.: 08/820,208

[22] Filed: Mar. 18, 1997

[51] Int. Cl.⁶ .............. H04B 10/16; H01S 3/00; G02F 1/35
[52] U.S. Cl. .............. 359/341; 359/124; 359/177; 359/337
[58] Field of Search .................. 359/124, 161, 359/177, 337, 341

[56] References Cited

U.S. PATENT DOCUMENTS

| | | | |
|---|---|---|---|
| 5,225,922 | 7/1993 | Chraplyvy et al. | 359/124 |
| 5,673,142 | 9/1997 | Fatibi et al. | 359/341 |
| 5,737,118 | 4/1998 | Sugaya et al. | 359/341 |

FOREIGN PATENT DOCUMENTS

| | | |
|---|---|---|
| 61 7527 | 9/1994 | European Pat. Off. . |
| 4-298725 | 10/1982 | Japan . |
| 63212984 | 9/1991 | Japan . |
| 4-324335 | of 1992 | Japan . |
| 4-75036 | 3/1992 | Japan . |
| 4-121715 | 4/1992 | Japan . |

*Primary Examiner*—Nelson Moskowitz

[57] ABSTRACT

A system and method for selectively amplifying an optical signal depending upon the amplification needs of an optical system at one point in time. The optical amplifier has an adjustable gain that can be controlled by a remote systems controller. As a result, if an optical path in an optical system is changed, the needed degree of amplification associated with that new optical path can be provided for by adjusting the optical amplifier. The output at the end of the optical system can therefore be kept within a predetermined operational range regardless to how the optical signal is switched within the optical system.

29 Claims, 1 Drawing Sheet

INTERACTIVE OPTICAL FIBER AMPLIFIER, SYSTEM AND METHOD

BACKGROUND OF THE INVENTION

1. Field of the Invention

The present invention relates to optical amplifiers and amplifier systems that are used to amplify light signals passing through an optical fiber network.

2. Description of the Prior Art

Optical fiber networks are used in a wide variety of applications to establish data communications between at least two remote locations. In these optical fiber networks, light signals experience losses as the signals travel through the optical fibers from one point to another. The degree of loss in the optical fiber network is due to many factors such as the length of the optical fibers, the quality of the optical fibers, splice joint reflections and the like. As a result, an initial light signal must often be amplified to compensate for losses as it travels from one point in the optical fiber network to another.

In many applications, the degree of loss between points in an optical fiber network are known. Accordingly, a fixed optical amplifier can be placed in the optical fiber network to compensate for that known loss. However, in many other applications, the optical paths in the optical fiber network are dynamically switched. As a result, a light signal traveling from one point in the optical fiber network to another may take one of several different possible optical pathways. The strength of the initial signal is the same regardless of the optical pathway traveled. However, the losses associated with each of the optical pathways is different. As a result, no one fixed amplifier or series of fixed amplifiers is ideal for all the possible optical paths where such paths are dynamically chosen.

In the prior art, amplification systems for dynamically switched optical fiber networks have been designed by averaging the needed amplification from one point in the optical fiber network to another. By averaging the required amplification, the light signal sometimes is under-amplified and other times over-amplified, depending upon the optical path followed. To compensate for the under or over-amplified signals, the optical receivers used in the optical fiber network have an exceptionally broad (frequency) operational range. In this manner, the optical receivers can receive and decipher either over amplified signals or under amplified signals. Such prior art broad band optical receivers, however, are expensive, thereby adding greatly to the cost of the overall optical fiber network.

A need therefore exists in the prior art for an optical amplifier and amplifier system that is dynamically adjustable to the exact needs of a given light signal.

SUMMARY OF THE INVENTION

The present invention concerns a device, supporting system arrangements and methods for selectively amplifying an optical signal depending upon the unique amplification needs of an optical system at one point in time. The optical amplifier has an adjustable gain that can be controlled by a remote systems controller by using a digital processor to calculate the proper gain and adjusting the output level to a predetermined system operational level. As a result, based upon the losses in a particular optical path in an optical system, the needed degree of amplification associated with that new optical path can be provided dynamically by appropriately adjusting the optical amplifier. The output at the end of the optical fiber network can therefore be maintained within a narrow operational range regardless of how the optical signal is switched within the optical fiber network.

The adjustable optical amplifier itself contains a laser source, such as one or more pump lasers, that provide for an adjustable output. The output of the laser source is coupled to a passive optical gain block which includes, for example, an erbium doped fiber, where the passive gain block provides amplification to the initial light signal. By actively adjusting the output of the laser source, the amplification gain of the optical amplifier is selectively controlled.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention optical amplifier and amplification system can be used in most any system that uses an optical fiber network, the present invention optical amplifier and amplification system is particularly well suited for applications having an optical fiber network that experiences dynamic switching between a signal source and user end units. By way of example, the present invention optical amplifier and amplification system will be described in an application where a dynamic optic fiber network joins a signal source to a user end unit by one of several different possible optical paths.

Figure 1:
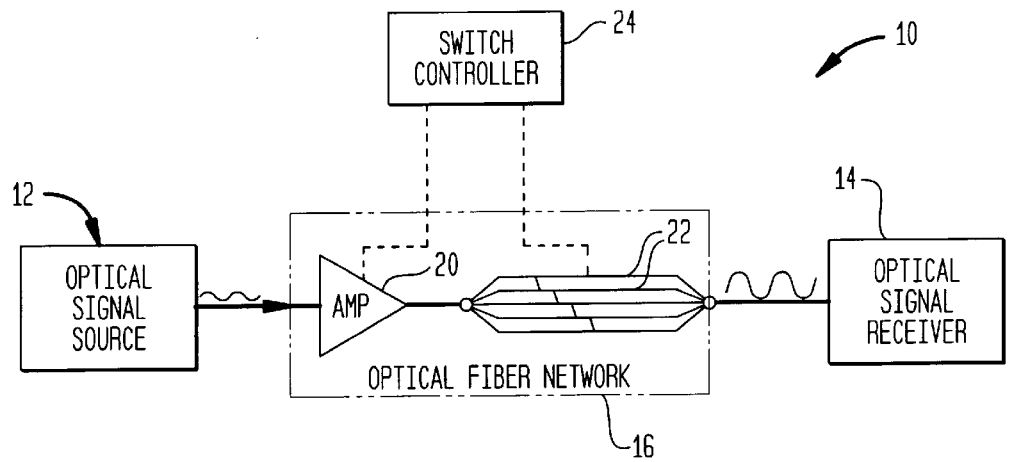
FIG. 1 is a general block diagram schematic of a fiber optic network containing the present invention amplification system.

Referring to FIG. 1, communication system 10 includes an optical signal source 12 that produces an initial light signal. The initial light signal is sent to a remote optical receiver 14 via an optical fiber network 16. Contained within the optical fiber network 16 is at least one interactive optical amplifier 20. Although only one optical amplifier 20 is shown, it will be understood that more than one such optical amplifier may be disposed in between the optical signal source 12 and the remote optical receiver 14 to produce an overall amplification system.

In the optical fiber network 16 there are multiple optical pathways that can be used to interconnect the optical signal source 12 and the remote optical receiver 14. The possible optical paths are shown by lines 22 in FIG. 1. The choice of which optical pathway 22 to be used is determined by various optical switches (not shown) contained within the optical fiber network 16. The optical switches are controlled by a switch controller 24 that is responsible for routing the light signal from the optical signal source 12 to the remote optical receiver 14 in the most practical manner possible.

Each possible optical path 22 in the optical fiber network 16 may have a different overall optical path length, splice joints and other features that cause optical losses. As a result, each possible optical path 22 in the optical fiber network 16 has its own loss characteristics. Accordingly, each of the optical paths 22 require different levels of amplification to compensate for signal loss. In FIG. 1, the interactive optical amplifier 20 is also coupled to the switch controller 24. As the switch controller 24 determines which optical path is to be used in connecting the optical signal source to the remote optical receiver 14, that information is also transferred to the interactive optical amplifier 20. Knowing the optical path that is being used, the interactive optical amplifier 20 automatically adjusts its output accordingly to compensate for the losses associated with the optical path selected. If the switch controller 24 changes the optical path 22 selected, the interactive optical amplifier 20 also changes its output to compensate for the losses in the newly selected optical path. As a result, the signal strength received by the optical signal receiver 14 can be maintained within a predetermined acceptable range regardless of the optical path 22 used within the optical fiber network 16.

In FIG. 1, the interactive optical amplifier 20 is shown at the beginning of the optical fiber network 16. It will be understood that such a location is merely exemplary and any number of interactive optical amplifiers 20 can be positioned at different points within the optical fiber network 16, provided the operation of those interactive optical amplifiers 20 is coordinated to produce a desired output signal strength at the optical signal receiver 14.

Figure 2:
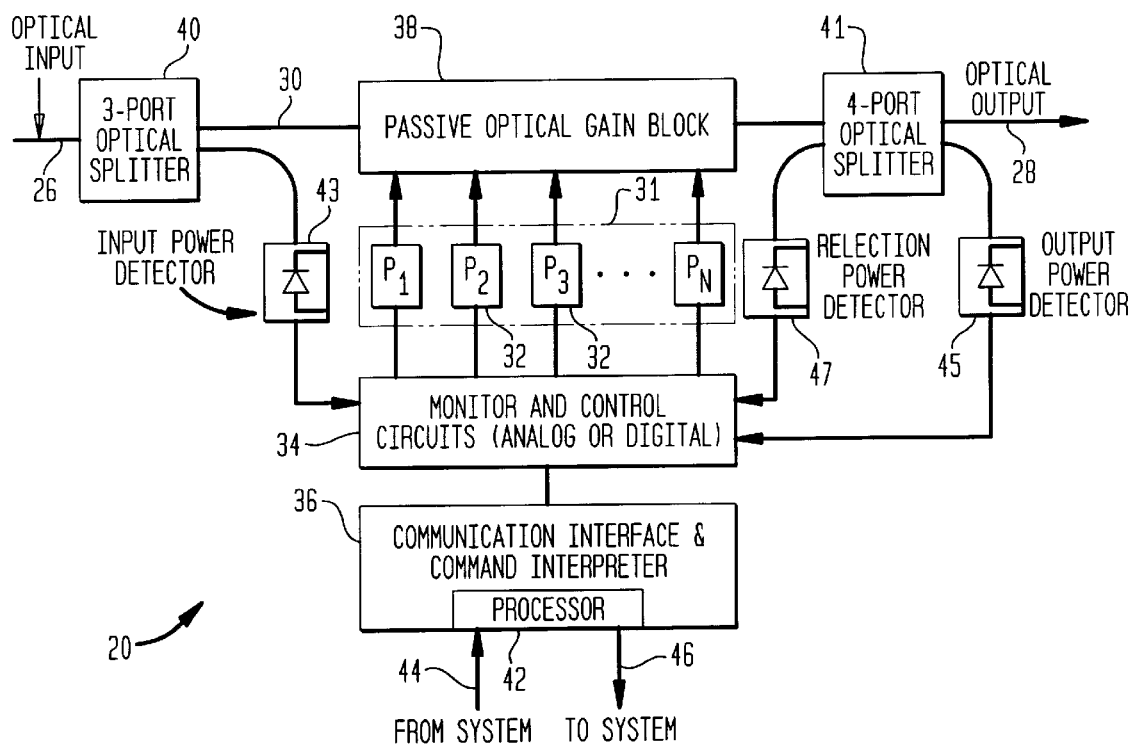
FIG. 2 is a block diagram schematic of an exemplary embodiment of an interactive optical fiber amplifier in accordance with the present invention.

Referring to FIG. 2, an exemplary schematic block diagram of one of the interactive optical amplifiers 20 is shown. As can be seen, the interactive optical amplifier 20 has an optical input port 26 and an optical output port 28 that are interconnected within the interactive optical amplifier 20 by a primary optical pathway 30. The optical input port 26 is adapted to receive an optical fiber coupled to the optical signal source 12 (FIG. 1). The optical output port 28 is adapted to receive an optical fiber that eventually leads to the optical signal receiver 14 (FIG. 1) through the optical fiber network 16 (FIG. 1).

Within the interactive optical amplifier 20 there is located a laser source 31, such as one or more pump lasers 32 or pump laser diodes. The pump lasers 32 are controlled by a monitor and control unit 34, wherein the monitor and control unit 34 regulates the output of the pump lasers 32. The monitor and control unit 34 may include analog circuitry such as a closed loop feedback controller or digital circuitry such as a digital processor to accomplish monitoring and control tasks for the interactive optical amplifier 20. The outputs of the pump lasers are coupled to a passive optical gain block 38 which includes, for example, a doped optical fiber such as an erbium doped fiber, ytterbium doped fiber or other suitable device. As would be understood by a person skilled it the art, the pump lasers 32 provide energy to the optical gain block 38 for amplification of the light signal entering the optical gain block.

First and second optical taps 40, 41 are disposed on a primary optical path 30 of the interactive amplifier 20 proximate the optical input port 26 and the optical output port 28, respectively. As shown, the first optical tap 40 is a 3-port splitter and the second optical tap 41 is a 4-port splitter. Each optical tap 40, 41 directs a small portion of the optical energy, for example, one percent, away from the primary optical path 30 at both locations, wherein the redirected energy is used to quantify the overall gain of the interactive optical amplifier 20. The light signal which is split by the first optical tap 40 passes through an input power detector 43, for example, a photodiode. The input power detector 43 converts this light signal to an electrical signal which may be input to the monitor and control unit 34, where the electrical signal corresponds to the signal strength of the light signal entering the interactive optical amplifier 20. The light signal exiting from the second optical tap 41 is similarly input to an output power detector 45 which outputs an electrical signal that corresponds to the signal strength of the light signal exiting the interactive optical amplifier 20. Additionally, the second optical tap 41 is further coupled to a reflection power detector 47 which detects reflection from the optical output port 28. A reflection power level above a certain point is indicative of a faulty connection or a break in the optical fiber cable which is coupled to the interactive optical amplifier. Thus, the outputs of both optical taps 40, 41 are received by the monitor and control unit 34. The monitor and control unit 34 compares the measured output signal strength to the measured input signal strength to derive the overall gain of the interactive optical amplifier 20. If the monitor and control unit 34 includes digital circuitry, such as a digital processor, microcontroller or digital signal processor, for implementing the monitor and control tasks, it would be understood that the electrical signals received from the input and output power detector 43, 45 would be converted to a digital signal by an analog-to-digital converter (not shown) located, for example, in the monitor and control unit.

A communications interface and command interpreter 36 is coupled to the monitor and control unit 34 as well as to the optical communications system 10 and provides a communications interface between the interactive optical amplifier 20 and the communications system 10. A digital processor 42, such as a digital processor, microcontroller or digital signal processor, is included in the communications interface and command interpreter 36, where the digital processor 42 communicates a desired gain value to the monitor and control unit 34. If the measured overall gain is either greater or lesser than the desired gain value, then the laser control unit 34 regulates the laser source 31 until the desired gain value is achieved. The digital processor 42 may also be included as part of the monitor and control unit 34 or alternatively, both the monitor and control unit 34 and the communications interface and command interpreter 36 may each include a suitable digital processor. The digital processor 42 receives the desired gain value from an external source, via an incoming data port 44 at the communication interface and command interpreter 36. The desired gain value can be manually entered at a user interface or can be automatically communicated to the digital processor 42 by a systems controller that directs the optical switching in an optical system.

Once the digital processor 42 reads a desired gain value, a control signal is sent to the monitor and control unit 34. If the monitor and control unit 34 is of the type that requires an analog signal, the control signal first passes through a digital-to-analog converter (not shown). The monitor and control unit 34 selects and regulates the pump lasers 32 until the desired overall gain value is achieved. The monitor and control unit 34 also emits a data signal (or possibly multiple data signals). The data signal contains within it information concerning operational status of the pump lasers 32 and the monitor and control unit 34. For instance, the data signal may contain information showing the efficiency of the pump lasers 32, the output power of the pump lasers 32, the power of the signal entering the optical amplifier 20, the power of the signal exiting the optical amplifier 20 and the overall efficiency of the optical amplifier 20. This information is communicated to the digital processor 42 after being converted to a digital signal by an analog-to-digital converter (not shown, if necessary.

The communication interface and command interpreter 36 includes an outgoing data port 46. The information concerning the operational status of the pump lasers 32 and laser control unit 34 is formatted by the digital processor 42 and made available for reading at the outgoing data port 46. As a result, any systems controller or systems user coupled to the communication interface and command interpreter 36 can inquire as to the operational status of the pump lasers 32, monitor and control unit 34 and the interactive optical amplifier 20 itself. In this manner, statistical process controls can be kept on the operation of the optical amplifier 20 and its components. Such statistical process controls enable preventative maintenance to be periodically performed to prevent the unplanned failure of the optical amplifier 20.

The use of the digital processor 42, as explained, enables the optical amplifier 20 to be interactive. The gain of the optical amplifier 20 can be selectively adjusted as needed to ensure a level light signal at the end of a primary optical path 30. Furthermore, the operational status of the optical amplifier 20 can be read from the digital processor 42 for use in monitoring and maintaining the overall system.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. An optical amplifier device for amplifying an incoming first light signal, comprising:
    an input port for receiving the first light signal;
    a laser source for producing a second light signal at a controlled power level;
    an optical gain block for combining said second light signal with the first light signal received at said input port to produce an amplified third light signal;
    a first optical tap that taps said first light signal;
    a second optical tap that taps said amplified third light signal;
    an input power detector coupled to said first optical tap for measuring said first light signal;
    an output power detector coupled to said second optical tap for measuring said amplified third light signal;
    a reflection power detector coupled to said second optical tap for measuring returning reflections of said amplified third light signal; and
    a digital processor control coupled to said input power detector, said output power detector and said reflection power detector, wherein said digital processor monitors data from said input power detector, said output power detector and said reflection power detector and selectively controls said laser source to vary said controlled power level of said second light signal to produce an amplification gain that substantially corresponds to a desired amplifier gain value.

2. The device according to claim 1, wherein said optical gain block includes a doped optical fiber.

3. The device according to claim 1, wherein said doped optical fiber is selected from the group consisting of an erbium doped optical fiber and a ytterbium doped optical fiber.

4. The device according to claim 1, wherein said laser source includes at least one pump laser.

5. The device according to claim 1, wherein said first optical tap and said second optical tap enable said digital processor control to monitor the incoming first light signal entering said input port and an outgoing light signal exiting said output port.

6. The device according to claim 5, further including a monitor and control unit coupled to said digital processor control and said laser source, wherein said monitor and control unit control said predetermined power level of said second light signal produced by said laser source.

7. The device according to claim 6, wherein said first and second optical tap couple to an input and output power detector, respectively, for converting a portion of said first and third light signal diverted by said first and second optical tap into a corresponding electrical signal, said input and output power detector being further coupled to said monitor and control unit.

8. The device according to claim 7, wherein said monitor and control unit detects reflections via said reflection power detector, wherein said monitor detects if the reflections surpass a threshold level.

9. The device according to claim 1, wherein said digital processor control has an outgoing data port and said digital processor control reads an operational status associated with said laser source and presents the operational status at said outgoing data port to be read by an external device.

10. The device according to claim 9, further including a communications interface for coupling between said digital processor control and said external device.

11. The device according to claim 6, wherein said monitor and control unit includes a closed loop feedback circuit.

12. The device according to claim 6, wherein said monitor and control unit includes said digital processor.

13. A system comprising:
    a light signal source;
    a light signal receiver;
    an optical fiber network disposed between said light signal source and said light signal receiver, wherein said optical fiber network contains multiple optical paths that each have a degree of optical signal loss associated therewith;
    at least one adjustable optical amplifier contained within said optical fiber network, wherein said at least one adjustable optical amplifier amplifies light received from said light signal source by a desired amount;
    a first optical tap disposed between said light signal source and each said adjustable optical amplifier;
    a second optical tap disposed between said light receiver and each said adjustable optical amplifier;
    an input power detector coupled to said first optical tap for measuring power of a light signal from said light signal source;
    an output power detector coupled to said second optical tap for measuring power of a light signal exiting said adjustable optical amplifier;
    a reflection power detector coupled to said second optical tap for measuring reflected signal reflected back to said adjustable optical amplifier; and
    a controller coupled to said input power detector, said output power detector and said reflection power detector, wherein said controller adjusts said at least one adjustable optical amplifier to compensate for said degree of optical loss associated with the optical fiber path containing said at least one adjustable optical amplifier.

14. The system according to claim 13, wherein said light signal receiver is capable of receiving a light signal within a predetermined range and said at least one adjustable optical amplifier amplifies the light signal wherein the light signal received by said light signal receiver is within said predetermined range.

15. The system according to claim 14, wherein each said adjustable optical amplifier includes:
- an input port for receiving a first light signal from said light signal source;
- a laser source for producing a second light signal at a desired power level;
- an optical gain block for combining said second light signal with the first light signal received at said input port to produce an amplified third light signal; and
- a digital processor control coupled to said laser source for selectively controlling said laser source and varying said predetermined power of said output light signal, thereby maintaining said multiplexed third light signal in said predetermined range.

16. The system according to claim 15, wherein said optical gain block includes a doped optical fiber selected from the group consisting of an erbium doped optical fiber and a ytterbium doped optical fiber.

17. The system according to claim 15, wherein said laser source includes at least one pump laser.

18. The system according to claim 15, further including a monitor and control unit coupled to said digital processor control and said laser source, said monitor and control unit adapted to control said desired power level of said second light signal produced by said laser source.

19. The system according to claim 18, further including a reflection power detector coupled between said second optical tap and said monitor and control unit for detecting reflections from said output port of said device and determining if the reflections fall below a desired power level.

20. The system according to claim 15, wherein said digital processor control has an outgoing data port and said digital processor control reads an operational status associated with said laser source and presents the operational status at said outgoing data port.

21. The system according to claim 15, further including a communications interface for coupling between said digital processor control and said controller.

22. A method of operating an adjustable optical amplifier for selectively amplifying a light signal, comprising the steps of:
- providing a laser source having an adjustable output;
- combining the output of the laser source with the light signal to create a combined output signal on an output optical pathway;
- adjusting said laser source so that said combined output signal falls within a desired range; and
- measuring reflections of said combined output signal from said output optical pathway to determine if the reflections are lower than an acceptable threshold.

23. The method according to claim 22, wherein said laser source includes at least one pump laser controlled by a digital processor.

24. The method according to claim 23, further including the steps of monitoring the signal strength of the light signal and the combined output signal with said digital processor to determine the degree of amplification gain provided.

25. The method according to claim 24, further including the step of supplying an amplification gain value to said digital processor wherein said digital processor adjusts said pump laser so that the degree of amplification gain provided substantially matches said amplification gain value.

26. The method according to claim 22, wherein said step of combining further including the step of passing said light signal through an optical gain block.

27. In an optical system having a light signal source and a light signal receiver coupled by an optical fiber network, wherein a light signal originating at said light signal source travels to said light signal receiver along a selected one of a plurality of different optical paths within the optical fiber network, a method of selectively amplifying the light signal so that the light signal received by the light signal receiver falls within an acceptable power range, said method comprising the steps of:
- positioning at least one adjustable optical amplifier in each of said plurality of optical paths;
- selecting a specific optical path in said optical fiber network between said light signal source and said light signal receiver;
- determining whether said specific optical path exceeds a level of signal reflectance; and
- adjusting said at least one adjustable optical amplifier contained within said specific optical path to amplify the light signal to a degree needed for the light signal to fall within said acceptable power range at said light signal receiver.

28. The method according to claim 27, wherein said step of adjusting includes communicating an adjustment signal to said at least one adjustable optical amplifier, whereby said at least one adjustable optical amplifier amplifies the light signal to the degree indicated by said adjustment signal.

29. The method according to claim 27, wherein said step of determining includes measuring signal reflectance in said specific optical path and comparing the signal reflectance with a maximum threshold value.

* * * * *